(12) United States Patent
Huang

(10) Patent No.: US 9,979,805 B1
(45) Date of Patent: May 22, 2018

(54) MULTI-FUNCTIONAL APPARATUS FOR MOBILE PHONE AND TABLET COMPUTER

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 0 days. days.

(21) Appl. No.: 15/611,875

(22) Filed: Jun. 2, 2017

(51) Int. Cl.
*H04B 1/3883* (2015.01)
*H04M 1/02* (2006.01)
*G06F 1/16* (2006.01)

(52) U.S. Cl.
CPC ........ *H04M 1/0262* (2013.01); *H04B 1/3883* (2013.01); *G06F 1/1632* (2013.01)

(58) Field of Classification Search
None
See application file for complete search history.

(56) References Cited

U.S. PATENT DOCUMENTS

| 2010/0171465 A1* | 7/2010 | Seal | G03G 15/5004 320/114 |
| 2011/0084651 A1* | 4/2011 | Caskey | H01R 25/006 320/107 |
| 2011/0227535 A1* | 9/2011 | Caskey | H01R 13/6675 320/111 |
| 2013/0267116 A1* | 10/2013 | Tin | H02J 1/00 439/535 |

* cited by examiner

*Primary Examiner* — Alejandro Rivero
(74) *Attorney, Agent, or Firm* — Jackson IPG PLLC; Demian K. Jackson

(57) ABSTRACT

A multi-functional apparatus is provided with a casing including first openings, a second opening, a third opening, a fourth opening, a fifth opening, and first and second cavities; a PCB in the casing and including a plurality of USB ports in the first openings respectively, an on/off switch in the second opening, a power-on light in the third opening, a power connector in the fourth opening, and a USB receptacle in the fifth opening; first and second holders retractably disposed in the first and second cavities respectively, each of the first and second holders including a horizontal platform and a vertical door; a seat on the PCB and including exposed recesses; and hollow members each including two peripheral flanges on lower and upper ends respectively, and wells on the peripheral flanges respectively. The lower flange of each hollow member is releasably disposed in one of the recesses.

4 Claims, 7 Drawing Sheets

MULTI-FUNCTIONAL APPARATUS FOR MOBILE PHONE AND TABLET COMPUTER

BACKGROUND OF THE INVENTION

1. Field of the Invention

The invention relates to multi-functional apparatuses and more particularly to a multi-functional apparatus for holding a mobile phone and/or a tablet computer, and charging same.

2. Description of Related Art

Conventional mobile phones (e.g., smartphones) and tablet computers (called tablets) have features including lightweight, portability, telephony, photo taking, illumination, alarm clock, calendar and Internet access. Most of their functions are the same as desktop computers with some even more advanced. Thus, they become more popular among consumers.

While mobile phones and tablets have features including lightweight and portability, charging, connection, disconnection and holder preparation are required. Preparation and storage of battery charger and holder is not easy and tedious. For example, mobile phones, tablets, laptops, digital cameras, and external hard disk drives may be used at the same time. Connections of USB (Universal Serial Bus) plugs and USB ports and locations of holders can be messy and cause great inconvenience.

Thus, the need for improvement still exists.

SUMMARY OF THE INVENTION

It is therefore one object of the invention to provide a multi-functional apparatus comprising a casing including a plurality of first openings, a second opening, a third opening, a fourth opening, a fifth opening, and first and second cavities; a printed circuit board (PCB) disposed in the casing and including a plurality of USB ports disposed in the first openings respectively, an on/off switch disposed in the second opening, a power-on light disposed in the third opening, a power connector disposed in the fourth opening, and a USB receptacle disposed in the fifth opening; first and second holders retractably disposed in the first and second cavities respectively, each of the first and second holders including a horizontal platform and a vertical door; a seat disposed on the PCB and including a plurality of exposed recesses; and a plurality of hollow members each including two peripheral flanges on lower and upper ends respectively, and a plurality of wells on the peripheral flanges respectively wherein the lower flange of each hollow member is releasably disposed in one of the recesses.

The above and other objects, features and advantages of the invention will become apparent from the following detailed description taken with the accompanying drawings.

DETAILED DESCRIPTION OF THE INVENTION

Figure 1:
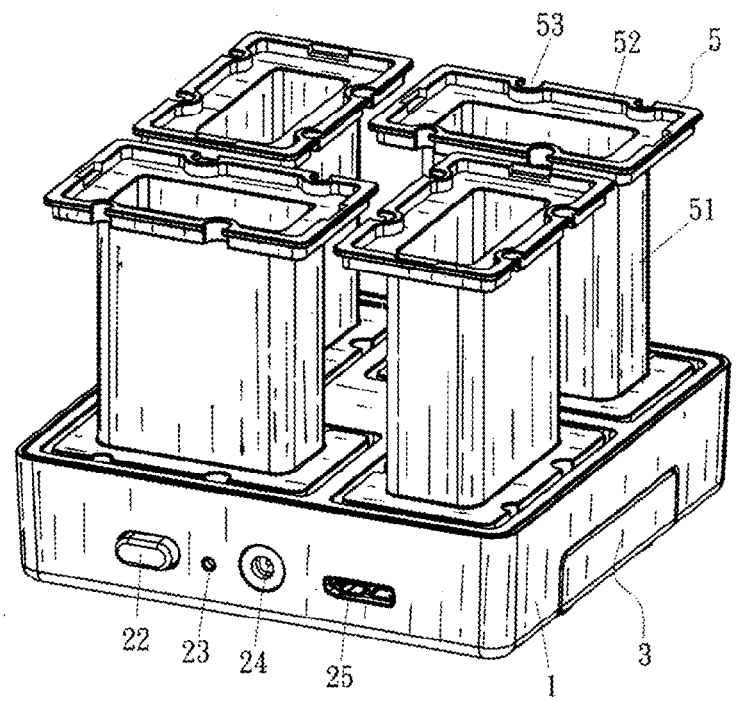
FIG. 1 is a perspective view of a multi-functional apparatus for mobile phone and tablet computer according to a first preferred embodiment of the invention.
Figure 2:
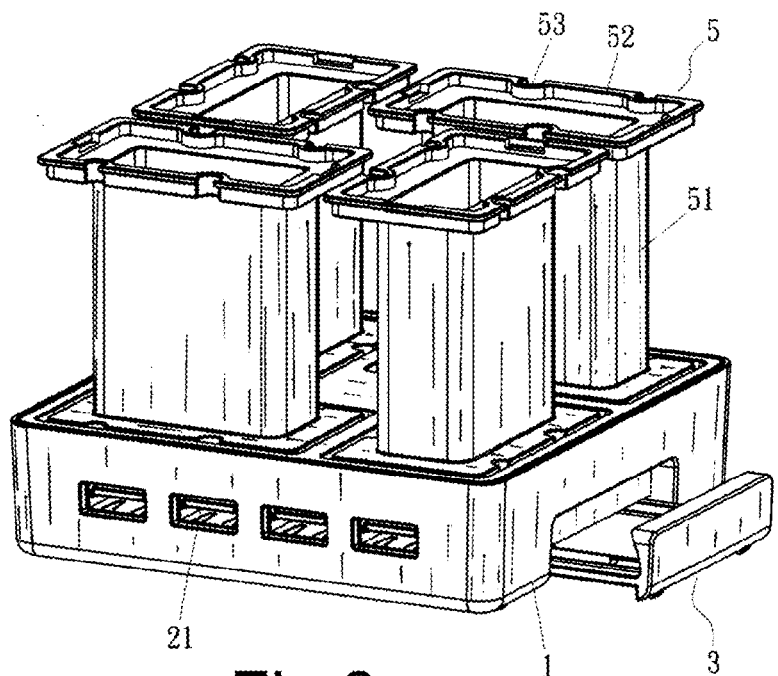
FIG. 2 is another view of FIG. 1 with one holder pulled out in a ready to use position.
Figure 3:
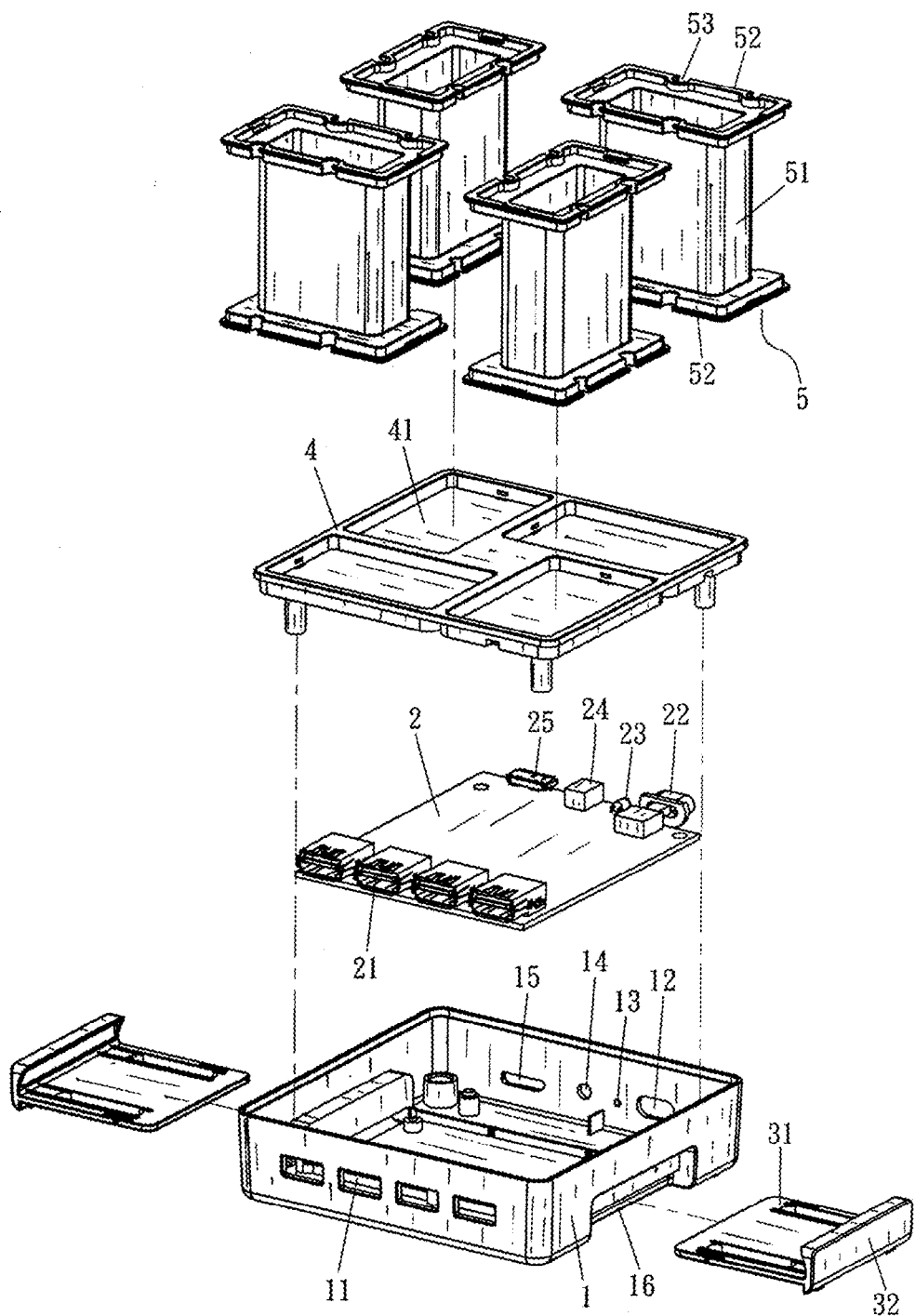
FIG. 3 is an exploded view of FIG. 1.

Referring to FIGS. 1 to 8, a multi-functional apparatus for mobile phone and tablet computer in accordance with a first preferred embodiment of the invention comprises the following components as discussed in detail below.

A parallelepiped casing 1 includes a plurality of first openings 11 on one side, a second opening 12 on the other side, a third opening 13 on the other side, a fourth opening 14 on the other side, a fifth opening 15 on the other side, and two cavities 16 on front and rear ends respectively.

A printed circuit board (PCB) 2 includes a plurality of USB ports 21 on one side and disposed in the first openings 11 respectively, an on/off switch 22 on the other side and disposed in the second opening 12, a power-on light 23 on the other side and disposed in the third opening 13, a power connector 24 on the other side and disposed in the fourth opening 14, and a USB receptacle 25 on the other side and disposed in the fifth opening 15.

Two holders 3 each include a horizontal platform 31 and a vertical door 32. The holders 3 are retractably disposed in the cavities 16 respectively.

A rectangular seat 4 includes a plurality of rectangular recesses 41 on a top surface. The seat 4 is disposed on the casing 1 with the PCB 2 disposed therebelow.

A plurality of hollow members 5 each include a hollow main element 51, two rectangular flanges 52 on lower and upper ends respectively, and a plurality of wells 53 on the flanges 52. The lower flange 52 is releasably disposed in the recess 41 by snapping.

Figure 4:
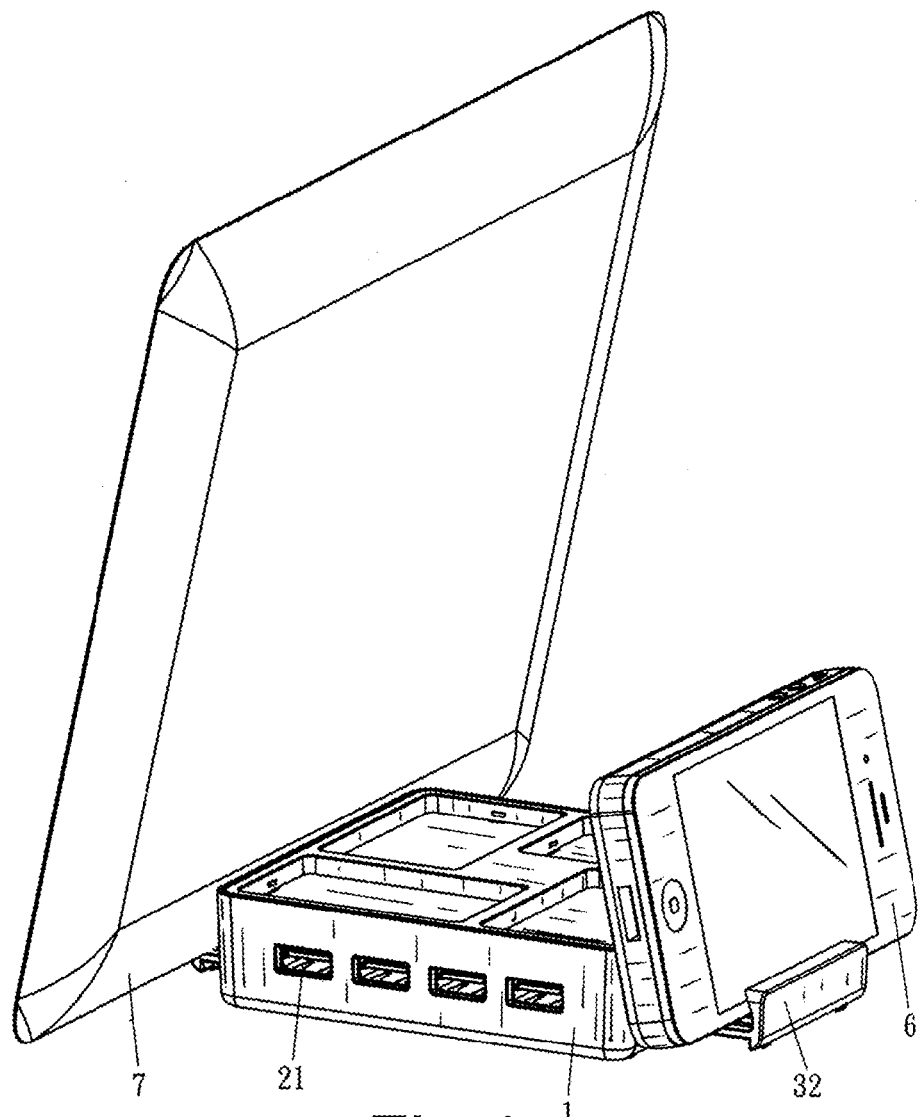
FIG. 4 is a view similar to FIG. 2 with the hollow members removed, a mobile phone placed on one pulled holder, and a tablet placed on the other pulled holder.
Figure 5:
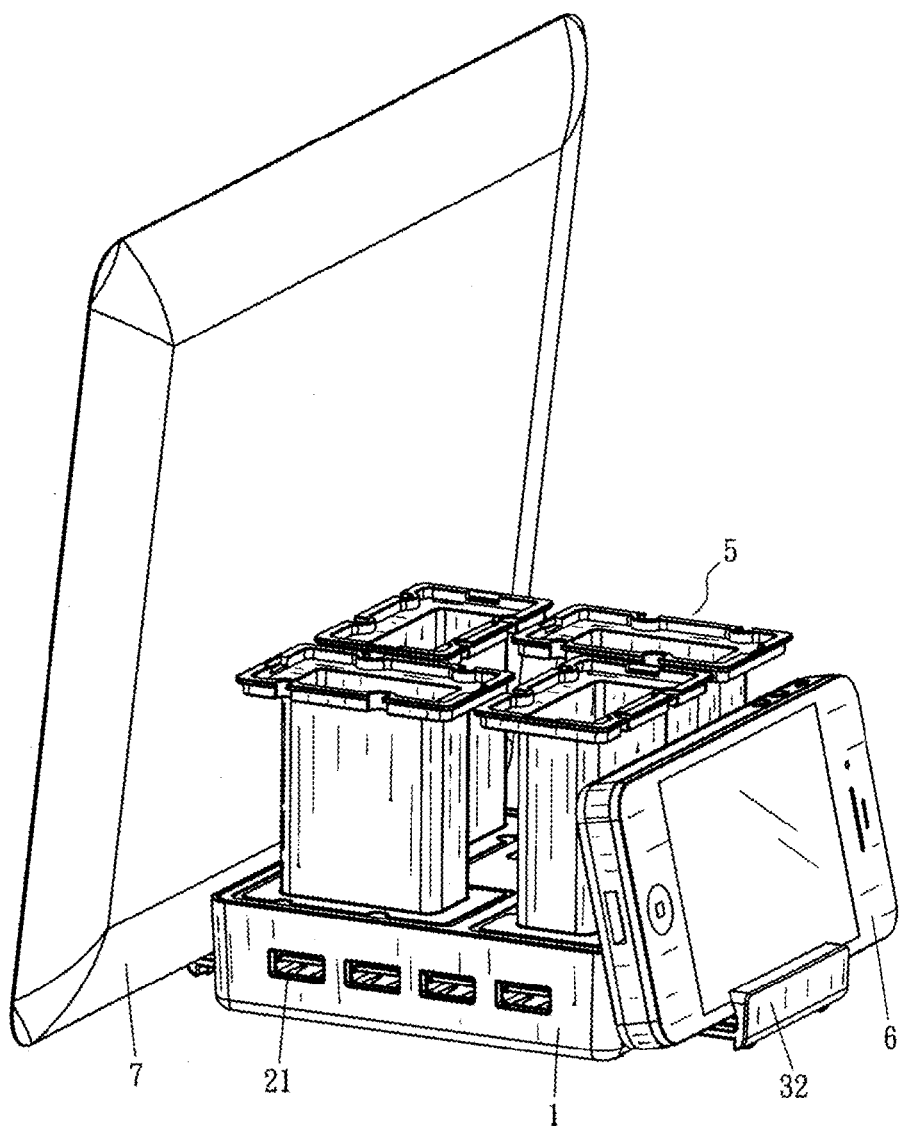
FIG. 5 is a view similar to FIG. 4 with the hollow members mounted.

As shown in FIG. 4, a mobile phone 6 is placed on one pulled holder 3, and a tablet 7 is placed on the other pulled holder 3 both in a storage position.

Figure 6:
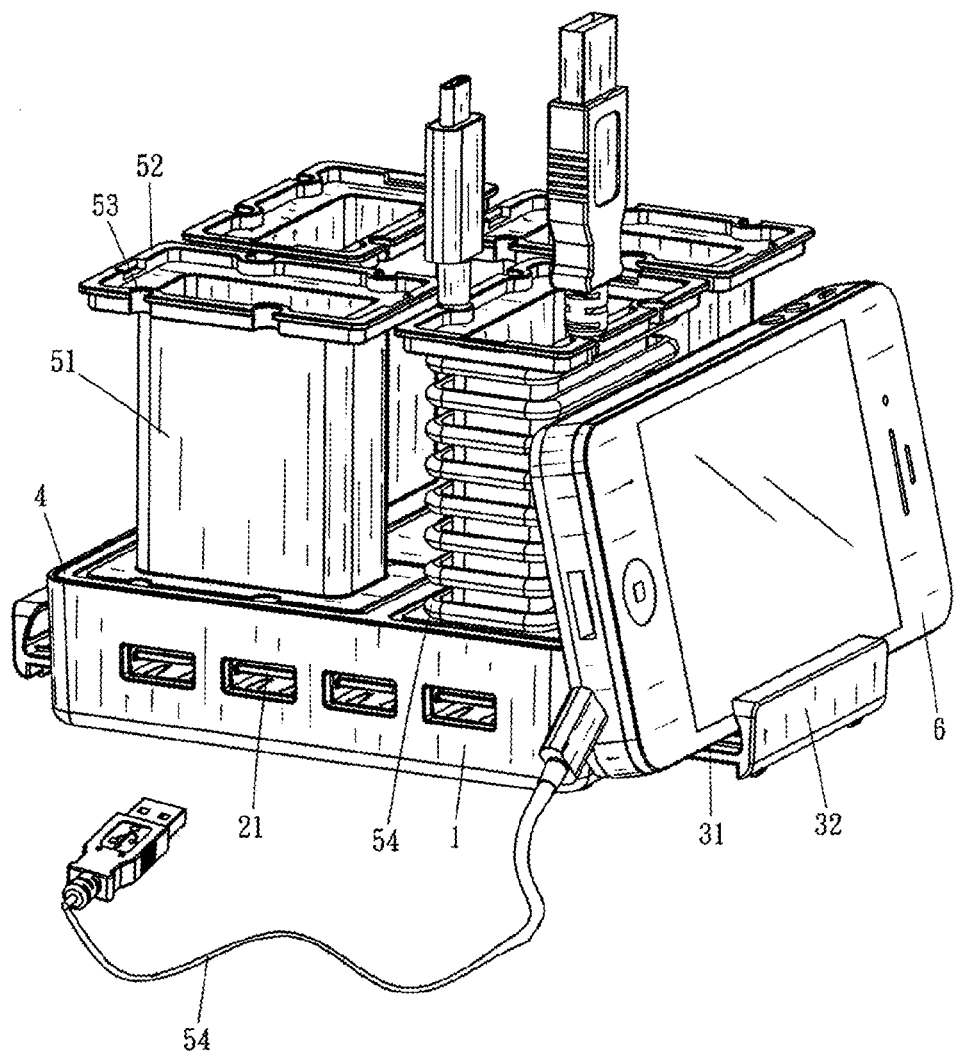
FIG. 6 is a perspective view of the multi-functional apparatus with cables sound on one hollow member, a mobile phone placed on one holder, the other hollow member pulled out, and a USB cable having one end connected to the mobile phone and the other end to be connected to a USB port of the multi-functional apparatus.

As shown in FIG. 6, a first USB cable (not numbered) is wound onto one hollow member 5, the first USB cable has a portion adjacent to its first USB plug fastened in the well 53 and a portion adjacent to its second USB plug fastened in another well 53, a mobile phone 6 is placed on one holder 3, and a second USB cable 54 has one end connected to the mobile phone 6 and the other end to be inserted into the USB port 21.

Figure 7:
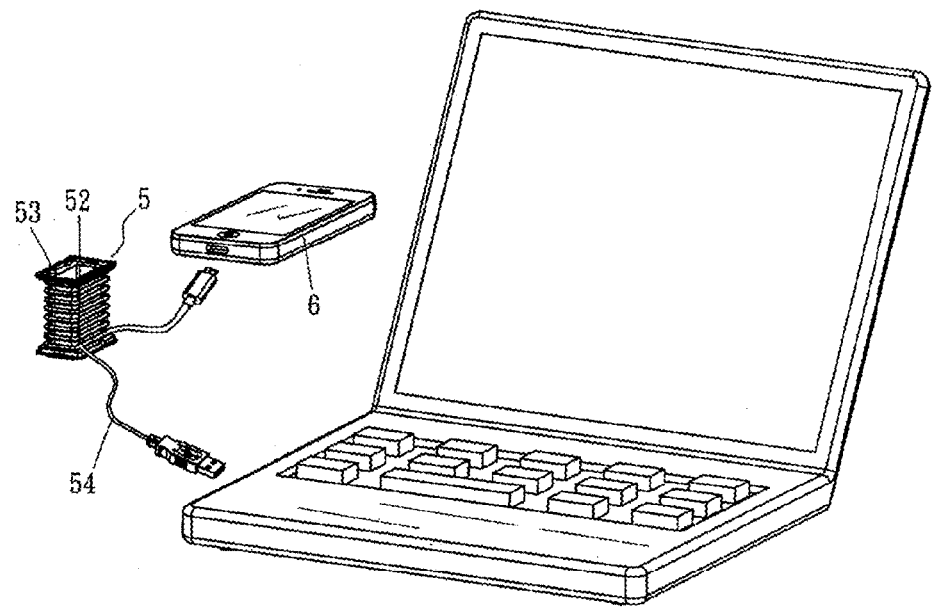
FIG. 7 is a perspective view showing a USB cable wound on the hollow member and having one end to be connected to a laptop and the other end to connected to a mobile phone.

As shown in FIG. 7, one hollow member 5 is removed from the casing 1, a USB cable 54 is wound onto the hollow member 5, one end of the USB cable 54 is to be connected to a mobile phone 6, and the other end of the USB cable 54 is to be connected to a laptop (not numbered).

Figure 8:
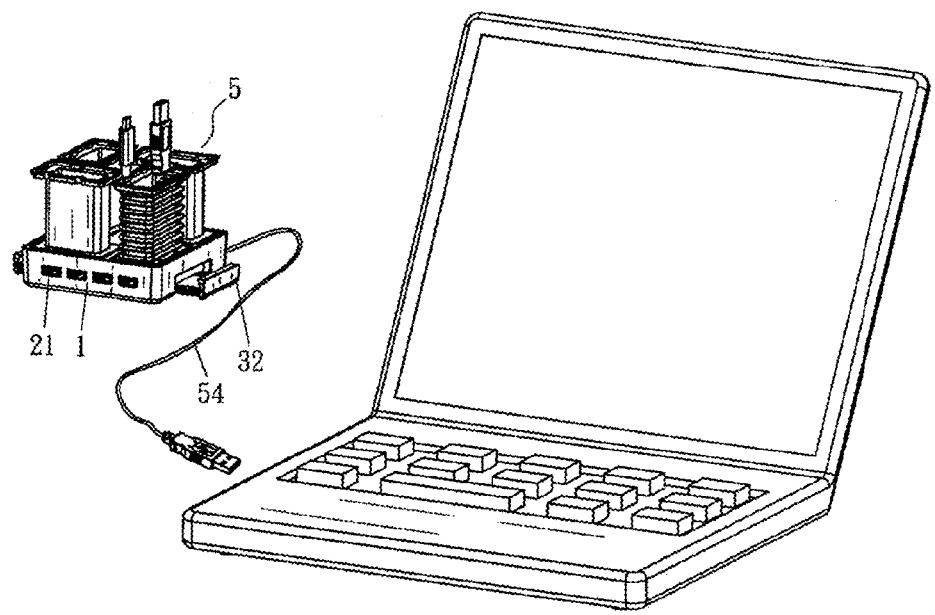
FIG. 8 is a perspective view showing a USB cable wound on one hollow member and the other end to be connected to a laptop.

As shown in FIG. 8, a first USB cable (not numbered) is wound onto one hollow member 5, the first USB cable has a portion adjacent to its first USB plug fastened in the well 53 and a portion adjacent to its second USB plug fastened in another well 53, and a second USB cable 54 has one end connected to the USB receptacle 25 and the other end to be connected to a laptop (not numbered).

Figure 9:
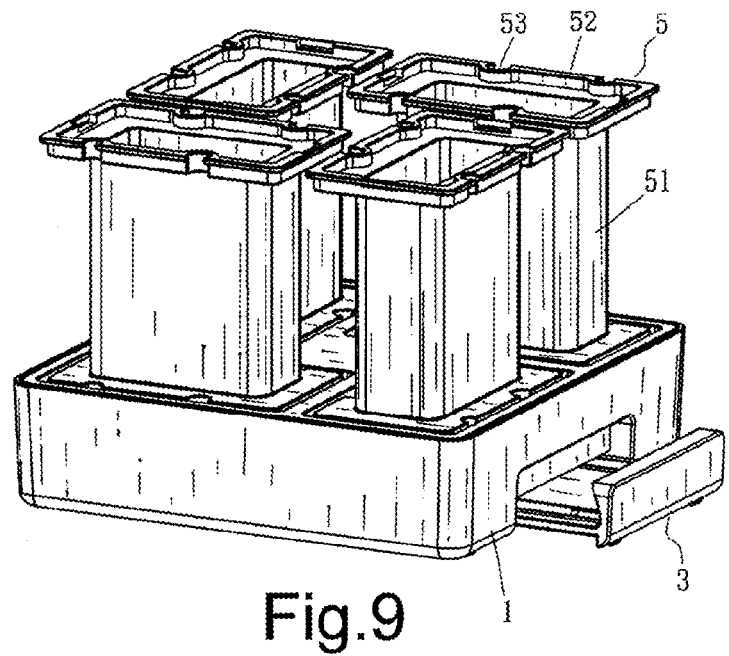
FIG. 9 is a perspective view of a multi-functional apparatus for mobile phone and tablet computer according to a second preferred embodiment of the invention.
Figure 10:
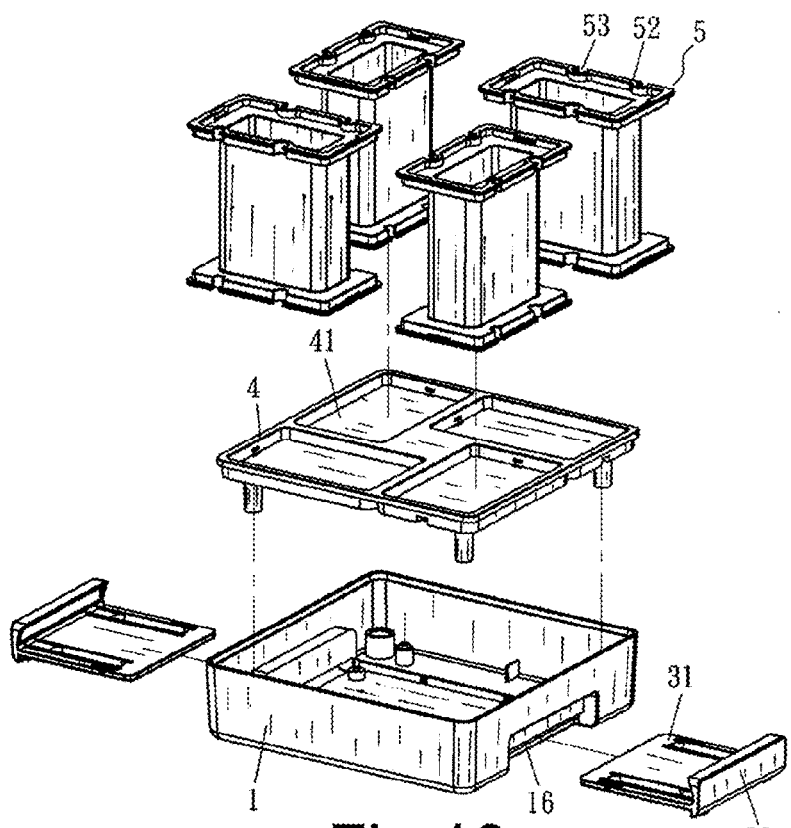
FIG. 10 is an exploded view of FIG. 9.

Referring to FIGS. 9 and 10, a multi-functional apparatus for mobile phone and tablet computer in accordance with a second preferred embodiment of the invention is shown. The characteristics of the second preferred embodiment are substantially the same as that of the first preferred embodiment except the following:

The casing 1 does not have openings. There is no PCB.

While the invention has been described in terms of preferred embodiments, those skilled in the art will recognize that the invention can be practiced with modifications within the spirit and scope of the appended claims.

What is claimed is:

1. A multi-functional apparatus comprising:
   a casing including a plurality of first openings on a first side, a second opening, a third opening, a fourth opening, and a fifth opening on an opposite, second side, a first cavity on an intermediate third side, and a second cavity on an opposite, intermediate fourth side;
   a printed circuit board (PCB) disposed in the casing and including a plurality of USB ports disposed in the first openings respectively, an on/off switch disposed in the second opening, a power-on light disposed in the third opening, a power connector disposed in the fourth opening, and a USB receptacle disposed in the fifth opening;
   first and second holders retractably disposed in the first and second cavities respectively, each of the first and second holders including a horizontal platform and a vertical door;
   a seat disposed on the casing with the PCB arranged below and including a plurality of exposed recesses on a top surface; and
   a plurality of hollow members each including two peripheral flanges on lower and upper ends respectively, and a plurality of wells on the peripheral flanges respectively wherein the lower flange of each hollow member is releasably disposed in one of the recesses.

2. The multi-functional apparatus of claim 1, wherein the seat, the plurality of exposed recesses, the peripheral flanges of each hollow member are all rectangular.

3. The multi-functional apparatus of claim 1, further comprising at least a first USB cable wound onto one of the hollow members.

4. The multi-functional apparatus of claim 1, wherein the casing defines a parallelepiped shape.

* * * * *